United States Patent

Kotscha et al.

[15] 3,653,548
[45] Apr. 4, 1972

[54] TAPPING COCK FOR MIXED DRINKS CONTAINING CARBONIC ACID

[72] Inventors: Hans Kotscha, Ratingen-Tiefenbroich; Karel Van Moock; Herbert Kuhnt, both of Lintorf, all of Germany

[73] Assignee: Tornado GmbH, Lintorf, Germany

[22] Filed: Dec. 11, 1969

[21] Appl. No.: 884,259

[30] Foreign Application Priority Data

Dec. 14, 1968 Germany ............... P 18 14 695.7

[52] U.S. Cl. ................. 222/129.1, 137/501, 137/607, 222/145
[51] Int. Cl. ............................................. B67d 5/56
[58] Field of Search .......... 222/129, 129.1, 133, 135, 145; 137/501, 607, 517

[56] References Cited

UNITED STATES PATENTS

| | | |
|---|---|---|
| 2,371,432 | 3/1945 | Pietro ................. 222/129 UX |
| 2,673,005 | 3/1954 | Brown ................ 137/607 X |
| 2,678,064 | 5/1954 | Brown ................ 137/607 X |
| 2,944,401 | 7/1960 | Beck .................. 137/517 X |
| 2,950,733 | 8/1960 | Perkins .............. 137/501 X |
| 3,455,332 | 7/1969 | Cornelius ........... 222/145 X |

Primary Examiner—Robert B. Reeves
Assistant Examiner—David A. Scherbel
Attorney—Ernest G. Montague

[57] ABSTRACT

A tapping cock for mixed drinks which comprises a feeding conduit each for fruit syrup and for carbonated water. Both said conduits are disposed in a cock housing. A discharge valve is operable from the outside in each of the conduits and opening and closing, respectively, the conduits. An outlet mouth piece receives the conduits. A control valve is disposed in the cock housing between the feeding conduit for fruit syrup and the discharge valve coordinated thereto holding constant the passing quantity thereof, independently from the pressure, temperature and viscosity, and the control valve having outlet openings disposed adjacent to the corresponding discharge valve.

5 Claims, 3 Drawing Figures

PATENTED APR 4 1972 3,653,548

INVENTORS
Hans Ustcha
Karel van Mossel
BY Herbert Kuhnt
Ernest Montague
attorney

TAPPING COCK FOR MIXED DRINKS CONTAINING CARBONIC ACID

The present invention relates to a tapping cock for mixed drinks containing carbonic acid, in general, and to such tapping cock with a feeding conduit for each of fruit syrup and carbonated water, which both, prior to leading together in the outlet mouth piece, are opened and closed, respectively, by means of an outlet valve operated from the outside, in particular.

Tapping cocks of this type are known per se. They comprise as a rule a housing with two conduits for separate feeding of liquid fruit concentrate and of water to which carbonic acid has been added. Both conduits meet, at first together in the outlet mouth piece and make possible thereby an intensive admixing of both liquids directly prior to the emergence from the tapping cock. In both conduits are provided in addition, before they join together, outlet valves, which can be jointly opened or closed from the outside and, in particular, manually or by means of a time switch operated by insertion of a coin.

Such tapping cocks form units closed by themselves, which are secured with other tapping cocks jointly on so called counters, while the other devices for the impregnation of water with carbonic acid, for cooling, controlling and adjusting of the liquid quantity are provided either in the housing of the counter or by corresponding long hose conduits in the cellar or also on any other place.

In a known tapping device the control valve controlling the flow of fluid syrup is connected only by hose conduits with the actual tapping cock, which control valve frees upon opening of the tapping cock the actual feeding conduit for the fluid syrup. By means of such cumbersome arrangement of the control valve not only the entire unit is unnecessarily rendered more expensive, but also the result of a substantially constant flow quantity obtained by the control valve is falsified, insofar as by the feeding conduit and its connection means additionally flow resistances result.

It is one object of the present invention to provide a tapping cock, which provides a separate feeding of syrup and carbonated water, as well as a mixing of these liquids in a predetermined mixing ratio.

It is another object of the present invention to provide a tapping cock, wherein between the syrup conduit and the outlet valve coordinated thereto, a control valve holding constant the passing quantity independently from pressure, temperature and viscosity is provided in the cock housing, the outlet openings of which are directly adjacent the outlet valve.

By the provision of a passage control valve in the housing of the tapping cock it is brought about for the first time, that the damaging influences of long conduit paths are eliminated in addition to their connections between the control valve and the tapping cock. In addition also an advantageous solution of the space problem is provided.

A further advantage of the present invention results in the particular formation of the control valve, which permits to maintain constant the passing quantity independently from the pressure, the temperature and the viscosity of the syrup. Finally the tapping cock has also devices which permit a mixing of the separately fed liquids in a predetermined mixing ratio, whereby not at last also the predetermined portion of the carbonic acid dissolved in water is retained.

With these and other objects in view, which will become apparent in the following detailed description, the present invention, which is shown by example only, will be clearly understood in connection with the accompanying drawing, in which.

Figure 1:
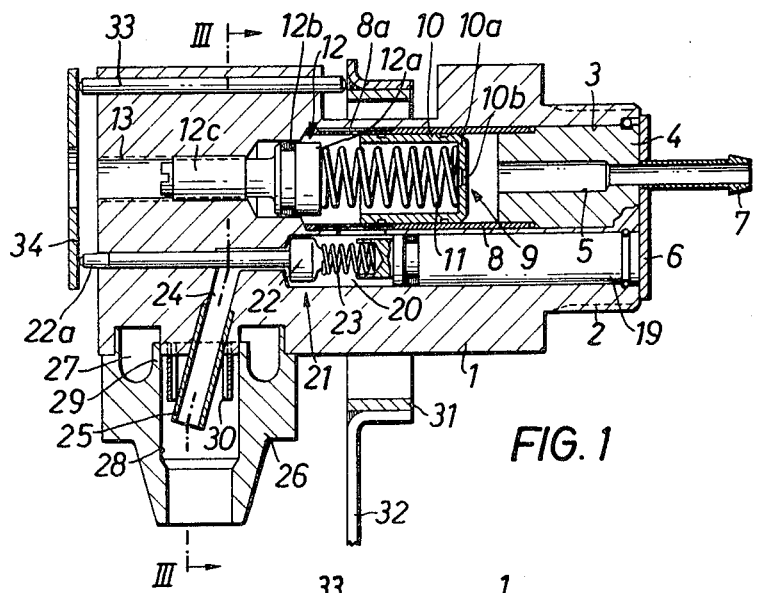
FIG. 1 is a longitudinal section along the lines 1—1 of FIG. 3.
Figure 2:
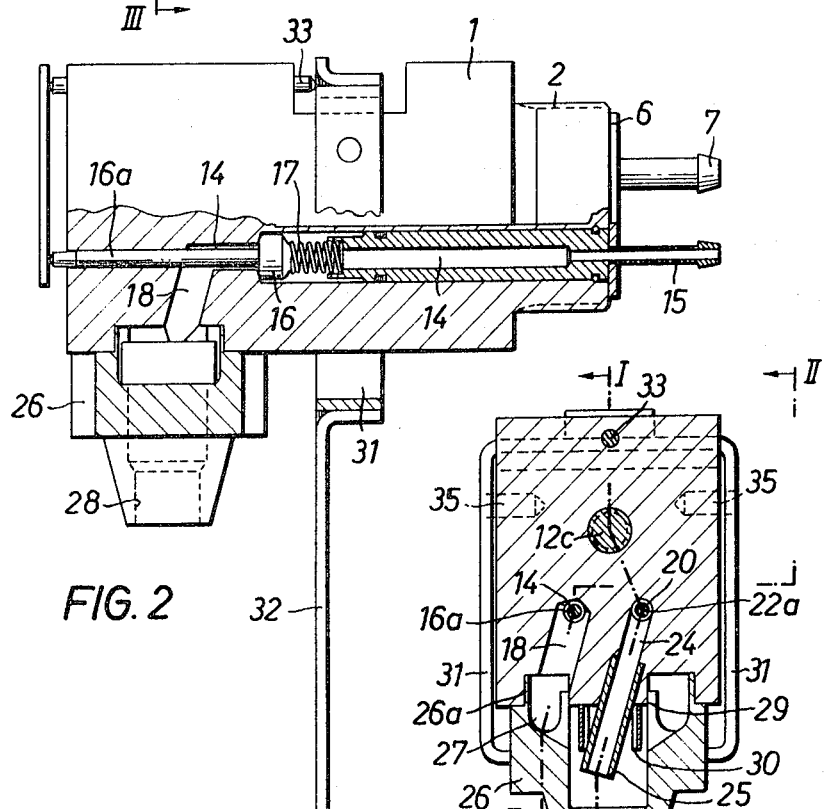
FIG. 2 is a part longitudinal section along the lines 2—2 of FIG. 3.

Referring now to the drawings, the housing 1 of a tapping cock is produced suitably of transparent synthetic material, resistant against impact, which synthetic material is particularly suitable for a mechanical working. With its rearwardly disposed collar 2 having a thread, the housing 1 is screwed-in in a mounting of a counter tapping device (not shown) and thereby secured.

Figure 3:
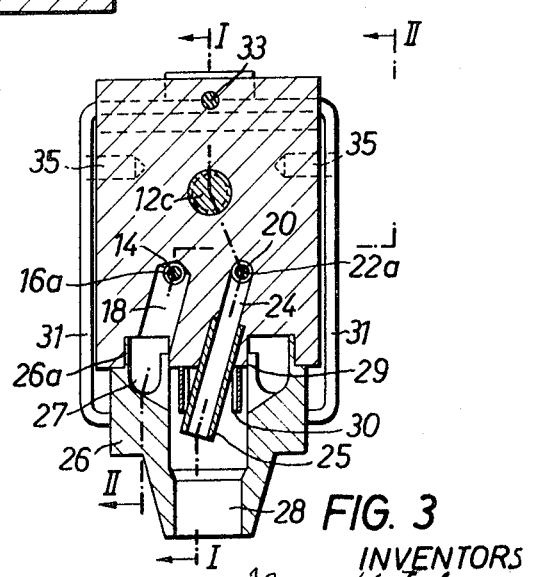
FIG. 3 is a cross-section along the lines 3—3 of FIG. 1.

In the upper part of the cock housing 1 extends from the rear side up to the half of the housing length a horizontal cylinder bore 3, which is closed up towards the outside by means of a cylindrical stopper 4 equipped with a syrup conduit 5. To the stopper 4, which is covered up at the end side by means of a plate 6, is arranged as continuation of a syrup conduit 5 a connection sleeve 7 for a hose conduit. In addition to the stopper 4 a control valve 9 sits in the cylinder bore 3, which control valve 9 is slidably guided in a cylinder bushing 8 equipped with outlet openings 8a and fitted into the cylinder bore 3. The control valve 9 comprises merely a hollow piston 10, with an end wall 10a pierced through in the direction towards the syrup conduit 5, against which a pressure spring 11 supports itself on an adjustable abutment 12. The opening cross-section of the bore 10b provided in the end wall 10a of the hollow piston 10 is dimensioned such, that it is at the most as large as that of the syrup conduit 5 opposite and spaced apart therefrom. The adjustable abutment 12 comprises a plate 12a with a sealing ring 12b engaging the slightly smaller cylinder bore 3 and a threaded tapping member 12c adjustable by means of a screw driver, which is disposed sunk within a threaded bore passing up to the front end face of the tapping cock housing 1. Below and parallel to the axis of the control valve 9 and towards the syrup conduit 5, respectively, is disposed in the cock housing 1 (FIG. 3) a set off but passing longitudinal bore, which serves as a water source 14 and is extended outwardly by means of a connection sleeve 15. The transfer from the larger to the smaller opening cross section of the longitudinal bore serves as as a seat for a valve body 16, the valve rod 16a of which projects beyond the front end face of the cock housing 1. The valve body 16 is maintained closed by means of a pressure spring 17 in the non-operative state. Within the range of the valve rod 16a, longitudinal bore changes into an obliquely downwardly directed channel 18. The conduit 20 is maintained closed by means of an outlet valve 21, which comprises a valve body 22 and a valve rod 22a. Likewise below and parallel to the axis of the control valve 9 is disposed next to the water source conduit 14 a blind bore 19 (FIG. 1) and following thereto a syrup side conduit 20. The valve body 22 is maintained closed by means of a pressure spring 23. Within the range of the valve rod 22a the syrup side conduit 20 leads at first through an oblique channel 24 into an extension piece 25. The channel 18, as well as the channel 24, with the extension piece 25 terminates into an outlet mouth piece 26 sitting at the bottom side of the cock housing 1, which outlet mouth piece 26 is secured with its annular collar 26a by a clamping effect of by threads on the tapping housing 1. The outlet mouth piece 26 has an annular chamber 27 standing in connection with the channel 18, the wall 29 of the annular chamber 27 with longitudinal slots 30 and drawn high against the central bore 28.

Finally, attention is called to another known device for the operation of the valve body 16 and 22a, which comprises a band clamp 31 surrounding on all sides the cock housing 1 with a downwardly directed operating lever 32. In the head part of the cock housing 1 sits parallel to the axis of the valve rods 16a and 22a a ram 33, which, on the one hand, engages the band clamp 31 and, on the other hand, engages a head plate 34. The band clamp 31 is laterally swingably disposed in the cock housing 1 by means of pins 35. By lateral pressure on the operating lever 32, which advantageously, is exerted by the cup to be filled, the ram 33 presses the upper edge of the head plate 34 tippingly disposed in front of the head housing 1 in outward direction, so that the two valve rods 16a and 22a are pressed inwardly by the now obliquely disposed bottom edge of the head plate 34. The valve bodies 16 and 22 are lifted thereby against the force of the pressure springs 17 and 23, whereby the liquids standing in front of the valve bodies 16 and 22 now can flow through the channels 18 and 24, and 25, respectively, into the outlet mouth piece 26.

The passage of water to which carbonic acid has been added takes place by means of the connection sleeve 15, the water conduit 14 and the channel 18 into the annular space 27 and from there through the longitudinal slots 30 into the central bore 28, as carefully as possible, in order not to vary the predetermined ratio between water and gas. The syrup assumes thereby its path through the connecting sleeve 7, the syrup conduit 5, the bore 10b in the control valve 9 and the output openings 8a, in order to change there into the adjacent side conduit 20 for syrup. The syrup can now enter in case of an open valve body 22 through the channel 24 and its extension piece 25 finally into the central bore 28 of the output mouth piece 26, in which an intimate admixing with the carbonated water takes place.

In order to maintain as much as possible constant the volume of both liquids, the output openings 8a for the smaller syrup part are also held narrower than the passages for the water not subjected to any constriction.

In order that the passing quantity of syrup remains also constant, if the viscosity or the pressure and/or the temperature of this liquid changes, the control valve 9 is disposed within the syrup conduit 5. Thus, for instance, a thick liquid, cooled syrup cannot pass the bore 10b in the control valve 9 without resistance, as it is possible in case of a thin liquid syrup. It is created therefore in the space between the hollow piston 10 and the stopper 4 a syrup pillow, which presses against the end wall 10a of the hollow piston 10, whereby the outlet openings 8a are more or less closed. By this control of the syrup feed an adjustment to the viscosity, temperature and pressure the passing quantity is maintained constant. This has the advantage, that the syrup is not required to be subjected, prior to the entrance into the tapping cock, to any treatment by cooling means for maintaining constant a predetermined temperature.

In an advantageous manner the tapping cock can also be combined with a time responsive quantity controller, which permits a full automatic dosage of the mixed drink.

While I have disclosed one embodiment of the present invention, it is to be understood, that this embodiment is given by example only and not in a limiting sense.

I claim:

1. A tapping cock for mixed drinks, comprising
a feeding conduit each for fruit syrup and for carbonated water,
both said conduits being disposed in a cock housing,
a discharge valve for each conduit operable from the outside of said conduits and opening and closing said conduits,
an outlet mouth piece receiving said conduits,
a control valve disposed in a cylindrical bore in said cock housing between said feeding conduit for fruit syrup and said discharge valve coordinated thereto,
said control valve comprising a hollow piston equipped with an end wall pierced centrally in a direction towards said feeding conduit for fruit syrup, and
a cylinder bushing, fitted in said cylindrical bore and having outlet openings, and
said hollow piston slidably guided in said cylinder bushing,
an adjustable abutment,
said hollow piston supporting itself operatively on said abutment by means of a pressure spring,
said outlet openings of said cylinder bushing being disposed adjacent to said corresponding discharge valve.

2. The tapping cock, as set forth in claim 1, which includes
a cylindrical stopper received in said cock housing and having a longitudinal bore,
said feeding conduit for fruit syrup is disposed in said bore cylindrical stopper,
the backside of said cock housing defining a cylindrical bore extending beyond one half of the length of said cock housing, and
said cylindrical stopper and said control valve are disposed in said cylindrical bore.

3. The tapping cock, as set forth in claim 1, wherein
the cross-section of the opening of said end wall of said hollow piston is dimensioned such, that it reaches at best to said feeding conduit for fruit syrup disposed opposite and spaced apart.

4. The tapping cock, as set forth in claim 3, wherein
said abutment comprises a plate with a sealing ring engaging said cylindrical bore and a threaded pin adjustable from the outside.

5. The tapping cock, as set forth in claim 1, further comprising
valve rods in each conduit cooperating with said discharge valves,
both said conduits change within the range of said valve rods into downwardly directed channels, whereby said channel feeding carbonated water terminates laterally in said outlet mouth piece, and
said channel feeding syrup has an extension piece projecting into a central bore of said outlet mouth piece,
said outlet mouth piece has an open annular space to be fed through said channel feeding carbonated water,
a wall drawn upwardly towards said central bore has longitudinal slots,
said outlet mouth-piece is screwable to the bottom side of said cock housing by means of an annular collar, and
said outlet mouth-piece is securable to the bottom side of said cock housing by means of an annular collar by a clamping means.

* * * * *